(12) United States Patent (10) Patent No.: US 8,700,802 B2
Williams et al. (45) Date of Patent: Apr. 15, 2014

(54) METHOD AND SYSTEM FOR PROVIDING ADVERTISING CONTENT SUITABLE FOR MULTIPLE PLATFORMS (75) Inventors: Carnet Williams, Honolulu, HI (US); Kevin Hughes, Honolulu, HI (US); Matthew McNeely, Epping, NH (US)

(73) Assignee: InMobi Pte Ltd., Singapore (SG)

( * ) Notice: Subject to any disclaimer, the term of this patent is extended or adjusted under 35 U.S.C. 154(b) by 275 days.

(21) Appl. No.: 13/179,102

(22) Filed: Jul. 8, 2011

(65) Prior Publication Data

US 2012/0011282 A1 Jan. 12, 2012

Related U.S. Application Data (60) Provisional application No. 61/362,687, filed on Jul. 8, 2010.

(51) Int. Cl.
*G06F 15/16* (2006.01)
*G06F 15/173* (2006.01)

(52) U.S. Cl.
USPC ............ 709/246; 709/203; 709/223; 709/224

(58) Field of Classification Search
USPC .................. 709/217, 246; 715/249, 719, 764
See application file for complete search history.

(56) References Cited

U.S. PATENT DOCUMENTS

| | | | | |
|---|---|---|---|---|
| 8,060,652 B2 * | 11/2011 | Eller | | 709/246 |
| 8,156,418 B2 * | 4/2012 | Gowda et al. | | 709/217 |
| 8,225,223 B2 * | 7/2012 | Becerra, Jr. | | 715/764 |
| 8,302,008 B2 * | 10/2012 | Hertenstein | | 715/719 |
| 8,392,826 B2 * | 3/2013 | Randall et al. | | 715/249 |

\* cited by examiner

*Primary Examiner* — Quang N Nguyen
(74) *Attorney, Agent, or Firm* — Convergent Law Group LLP (57) ABSTRACT

Computer-implemented methods and systems for providing dynamic content to users are described. The dynamic content is received from a developer. A plurality of dynamic representations of the dynamic content is provided. The plurality of dynamic representations corresponds to a plurality of dynamic formats. Logic corresponding to the plurality of dynamic representations is provided to the developer.

16 Claims, 5 Drawing Sheets

METHOD AND SYSTEM FOR PROVIDING ADVERTISING CONTENT SUITABLE FOR MULTIPLE PLATFORMS

CROSS-REFERENCE TO RELATED APPLICATIONS

This application claims the benefit of provisional Patent Application Ser. No. 61/362,687, filed Jul. 8, 2010, entitled METHOD AND SYSTEM FOR PROVIDING ADVERTISING CONTENT SUITABLE FOR MULTIPLE PLATFORMS, assigned to the assignee of the present application, and incorporated herein by reference.

BACKGROUND

Content, such as advertising content, is desired to be delivered to end users employing a variety of devices. For example, an ad may be desired to be served to a user via a site on the World Wide Web or through some other analogous mechanism. Different devices and/or sites may support different formats. For example many devices and sites support flash or SWF files for providing video content. Others support HTML5 or analogous formats. Still other devices support none of the formats. Further, different devices, such as phones, laptops, tablets and other portable computing devices, desk top systems, televisions, game consoles and/or other devices may have different operating systems and/or hardware. In order to provide content available to all of these devices, a developer typically generates the advertising or other dynamic content in a single format. Such dynamic content may include video, audio, or other content (such as buttons or menus) that cause changes in the page viewed by an end user over time or in response to input by the end user. For example, the developer may generate a video clip in a SWF file. This clip is played on devices supporting Flash. The developer may also generate static content, such as a single image. For those devices or sites that do not support the generated format, the single image is provided in lieu of the video clip.

BRIEF SUMMARY

The exemplary embodiment provides methods and systems for providing dynamic content to users. A developer generates the dynamic content, such as an ad. The dynamic content may be generated once regardless of the number of dynamic formats in which the dynamic content is desired to be supported. Stated differently, the developer need not generate dynamic content separately for each of the dynamic formats desired to be supported. The multiple dynamic representations of dynamic content are automatically provided in multiple dynamic formats, such as Flash and HTML5. A static representation corresponding to the dynamic content may also be also provided in a generic static format. If available, the appropriate dynamic representation for the end user is provided to the end user when an end user accesses the dynamic content. If not available, then the static representation may be provided to the end user.

DETAILED DESCRIPTION

The exemplary embodiment provides methods and systems for providing dynamic content to users. A developer generates the dynamic content, such as an ad. The dynamic content may be generated once regardless of the number of dynamic formats in which the dynamic content is desired to be supported. The developer may then choose to publish the dynamic content. The multiple dynamic representations of dynamic content are automatically provided in multiple dynamic formats, such as Flash and HTML5. A static representation corresponding to the dynamic content may also be also provided in a generic static format. If available, the appropriate dynamic representation for the end user is provided to the end user when an end user accesses the dynamic content. If not available, then the static representation may be provided to the end user.

The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Further, steps may be separated or combined in various embodiments. Thus, the present invention is not intended to be limited to the embodiments shown, but is to be accorded the widest scope consistent with the principles and features described herein.

Figure 1:
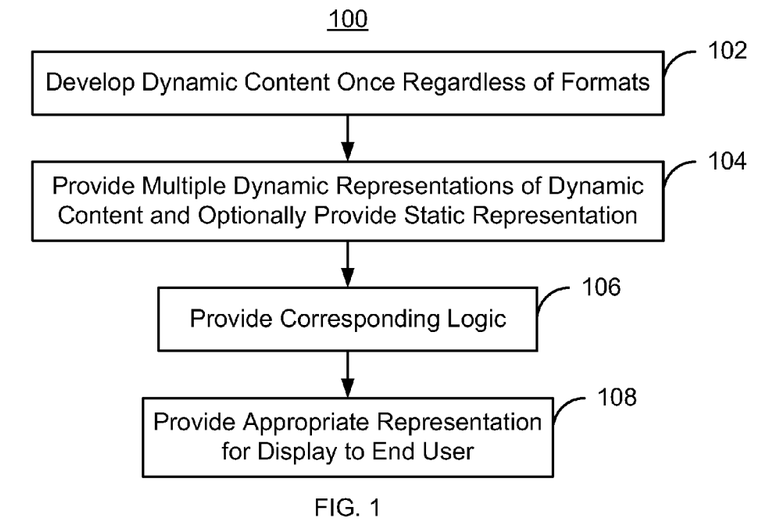
FIG. 1 depicts an exemplary embodiment of a method for providing dynamic content compatible with multiple dynamic formats.

FIG. 1 depicts an exemplary embodiment of a method 100 for providing dynamic content compatible with multiple dynamic formats. As used herein, a dynamic format is a format which supports dynamic content, such as an interactive ad that changes behavior based on user input. For instance, the user selecting a button causes an image to change in a particular way. Examples of dynamic formats include Flash (or SWF) and HTML5. In some embodiments, the dynamic formats may include binary format or a nonbinary format. The nonbinary formats may require an interpreter for execution or may merely be a representational language. For example, a dynamic format may include a human readable language such as XML. A dynamic format may also be considered to include the devices on which the dynamic content is to be played. In addition to using Flash versus HTML5, the devices may have different requirements based on the hardware, operating system, and/or other characteristics of a particular device. For example, the input method may be a click or tap, the input hardware might be a mouse, touchscreen, television remote or game console remote, depending upon the device. The operating system and application (e.g. browser) may also differ between devices. The dynamic format thus includes the format (such as Flash or HTML5), the hardware, and the software environments used on different devices. Although the method 100 is described as including particular steps, the method 100 may include other steps not inconsistent with the method and system. Further, certain steps of the method 100 might be combined or split into multiple substeps. Although the method 100 is described in a particular sequence, in some embodiments certain steps may be performed in another order and at least partially in parallel.

A developer is allowed to provide dynamic content, via step 102. The dynamic content is multimedia content that includes dynamic images, such as video, and may include other content such as audio, static images, or other features. In developing the dynamic content in step 102, the developer may mix preexisting content, form new content, edit a preexisting template, and/or upload at least a portion of dynamic content. For example, the developer may set the colors used, set the configuration of buttons and links, set the sources for video or other multimedia content, provide video or other multimedia content, and/or otherwise configure the dynamic content. As part of providing dynamic content in step 102, the developer may also specify the logic and/or interactivity, For example, the developer may specify the order and conditions under which content changes dynamically. The developer might specify a particular time, number of times content is accessed, or other condition which, when fulfilled, results in a change to the content. With respect to the interactivity, the developer may indicate how the content changes in response to a user's action. For example, a developer may specify that when a particular button is selected, certain content should appear or hide. The developer might also indicate that particular images may be dragged and changes to the image based on the dragging. Further, the developer may specify particular devices and/or categories of devices on which the dynamic content is desired to be played. For example, the developer may select one or more of the following: iPhones™, other cell phones, iPad™, other tablets, laptops, other portable computing devices, game console(s), and televisions, In other embodiments, the developer need not select specific devices. Thus, the developer configures the dynamic content as desired.

In step 102, the developer need not configure the dynamic content once for each dynamic format. In some embodiments, the developer only configures the content once regardless of the number of dynamic formats in which the dynamic content is desired. In some embodiments, this configuration may be completed in XML. For example, the developer may desire the dynamic content to be playable on devices and/or sites which only support Flash, which only support HTML5, and which only support a third dynamic format. For example, the developer want dynamic ad to be playable on a cell phone such as an Android™ compatible cell phone, an Apple® iPhone™, an iPad™ or other tablet, and/or a site such as Facebook®, which may support different dynamic formats, such as Flash (for Facebook®) and HTML5 (for an Apple® iPhone™). Thus, the ad is desired to be playable on a range of dynamic formats corresponding to a range of devices. The developer may also wish to make a representation of the dynamic content available in another representational language, such as C. In step 102, the developer would configure the ad, for example using desk top development tools and/or development tools accessible through a server. The developer need only configure the ad once, even though at the ad is desired to be compatible with least three dynamic formats (Flash, HTML5, and C). Thus, although the developer may perform step 102 multiple times and/or edit the content provided multiple times, this would not be required to provide content that is compatible with multiple dynamic formats. Instead, such repeated development or editing of content may be at the developers discretion.

Also in step 102, the developer may select other options for the dynamic content. For example, the user may choose the order in which different formats are provided to an end user. For example, the developer may desire the dynamic content to be provided in Flash and HTML5 formats, as well as a static image for other platforms used by an end user or site. The developer might select to have Flash displayed first, then HTML5 if the site or end user's device does not support Flash, and then a static image displayed if the site or end user's device does not support Flash or HTML5. Alternatively, the developer might opt to have HTML5 displayed first, then Flash if the site or end user's device does not support HTML5, and then a static image displayed if the site or end user's device does not support Flash or HTML5. In another embodiment, the developer might opt to have a static image displayed while the site or end user's device is interrogated to determine the format supported, and then display either Flash or HTML5 based on the results of the interrogation. The developer might also decide to have a particular format be available only on selected sites or platforms. Thus, the developer might determine that certain formats are not to be used in particular situations. The developer may have some other logic to determine how the dynamic representations are to be used. The developer may also allow a third party to make changes to the developer's selections or may opt not to allow changes. Alternatively, the developer may allow only certain third parties to make changes and/or allow only certain changes to be made to the developer's selections. The developer may also choose whether the dynamic content is copyable by an end user, whether the dynamic content may be modified and/or whether other changes may be made to the configuration selected by the developer. When the developer has completed selections, the developer may then choose to publish the dynamic content. For example, the developer may be allowed to click a "Publish" button in step 102. Note that in some embodiments, at least some selections, such as the modifiability of the dynamic content, may be made after the developer opts to publish the dynamic content.

The dynamic content is automatically published, or provided, in multiple dynamic formats, via step 104. Publishing the dynamic content in step 104 includes providing multiple representations of the dynamic content in multiple dynamic formats. For example, the dynamic content may be translated and/or compiled into representations in Flash, HTML5, and/or native device formats such as objective C or Android XML. Other formats, both binary and nonbinary, may also be supported. The dynamic formats may include human readable formats, such as XML, C, or other human readable formats/representational languages. Also in step 104, a static representation of the dynamic content may be provided. For example, a static image representative of the dynamic content may be generated as the static representation. The static image may be selected by the developer, may be automatically selected from some portion of the dynamic content, may be a default image, or simply a blank window. The static representation may be used, for example, if none of the dynamic formats are available, when a determination as to the appropriate dynamic format is being made, and/or for other purposes. As part of the translation process in step 106, code may be added, pruned, and/or additional logic provided to account for differences in dynamic format, the desired interactivity and dynamic nature of the ad. As a result, the ad may retain as much of its intended interactivity and appearance (as expressed by the preferences selected by the developer in step 102) across multiple devices. The additional code/logic provided depends upon the desired dynamic formats and interactivity. For some dynamic formats, code that supports certain interactivity and logic may be added. Other dynamic formats may require that existing capabilities of the format be augmented or disabled. If disabled, the translation process provides a work around to attempt to retain the desired interactivity. For example, if a swipe is specified as an input method and the device is a game console, then pressing of a specific button on the controller may be substituted for a swipe. Some of the user interactions that are translated across dynamic formats may include clicking, dragging, dropping, flicking, and swiping, as well as device tilting, shaking, and rotation. In addition to providing the appropriate code, the size of the code provided may also be optimized through the translation in step 106. In some embodiments, only the logic required for translation into a particular dynamic format is provided for that dynamic format. Code that would not be utilized in a particular dynamic format is removed. In other embodiments, additional code, including code that is not used by the dynamic format may be provided for one or more of the dynamic formats. Such a translation may be simpler, but may also result in a significant amount of unusable code being provided across dynamic formats. Step 106 may include storing the dynamic content in one or more of the dynamic formats.

Logic corresponding to the dynamic content in the dynamic formats is provided to the developer, via step 106. Stated differently, the resultant logic corresponding to the translations and other activities performed in step 104 are provided to the developer in step 106. In some embodiments, the dynamic content is embedded in the logic. Stated differently, the dynamic representations of the content may be embedded in the logic. In other embodiments, the logic includes an indication, such as a tag or address, of the location at which the dynamic representations are stored as well as the dynamic format used. In other embodiments, a combination of embedding the dynamic content/representations and embedding an indication of locations of the dynamic representations may be used. In some embodiments, step 106 may also include the developer providing the logic to sites or their owners. Thus, the logic, and thus the corresponding dynamic representations of the dynamic content, may be made publicly accessible.

If available, the appropriate dynamic content for the end user is provided to the end user when an end user accesses the content, via step 108. If not available, then the static content may be provided to the end user in step 108. Note that step 108 may be decoupled from step 102, 104, and 106. Steps 102, 104, and 106 relates to development of the dynamic content. In contrast, step 108 relates accessing/viewing the dynamic content. Thus, not only may steps 102, 104, and 106 be decoupled in time from step 108, but also in terms of the devices used. For example, steps 102, 104, and 106 may be performed by a developer on the developer's system optionally in connection with another development system. Step 108 may be performed after the representations provided in step 104 have been stored and/or embedded and the logic provided in step 106 provided to a site. Step 108 may include the user accessing the sites on which the logic has been provided. For example, the user may access as site using a browser residing on the user's machine. Based on the parameters set for the site and/or characteristics of the user's machine, the logic determines the appropriate dynamic representation to provide to the end user. This representation is provided to the end user's machine. The end user's machine may then play the dynamic representation in a conventional manner.

For example, Flash and HTML5 representations of the dynamic content may be provided through step 102, 104, and 106. In response to the end user accessing logic on a site on which the logic resides, for example by clicking a button or simply going to the site, Flash or HTML representations may be provided to the user's machine. Thus, the end user may view the dynamic content generated by the developer. Step 108 may also include providing the static representation in lieu of or in addition to the dynamic representation. Step 108 may also include interrogating the device utilized by the end user and/or the site accessed by the end user in order to determine the appropriate dynamic format for the device and/or site.

Using the method 100, the appropriate dynamic representation of dynamic content may be provided to an end user. This may be accomplished without requiring separate development the dynamic content for each dynamic format desired to be supported. As a result, a developer may simply and easily provide dynamic content, such as an ad, for multiple sites and/or platforms. For example, Flash, HTML5 and/or other dynamic formats may be supported without requiring significant additional effort on the part of the developer of the dynamic content. In addition, the developer or other party may elect how the dynamic representation(s) and/or static representation(s) are provided to the end user. Thus, the flexibility of the development process and presentation of content to the end user may also be improved.

Figure 2:
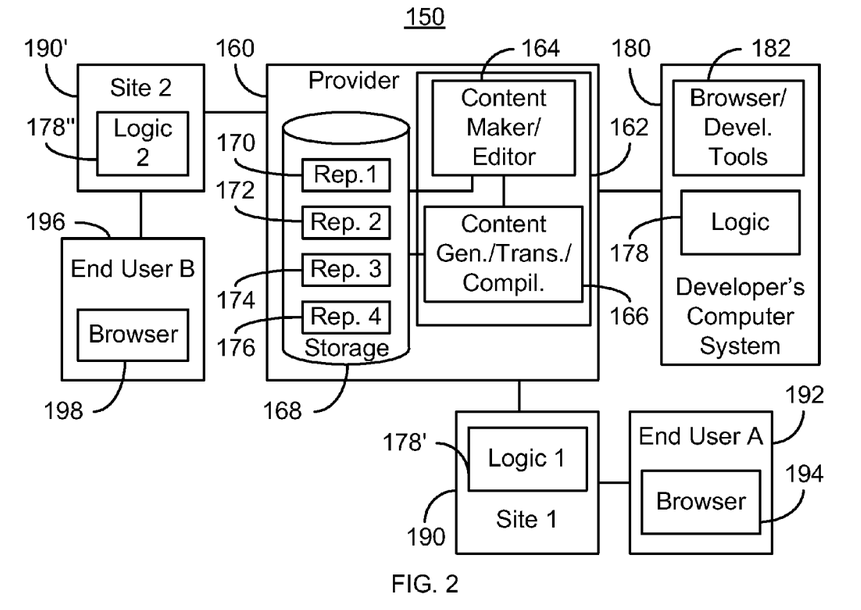
FIG. 2 depicts an exemplary embodiment of a system for providing dynamic content compatible with multiple dynamic formats.

FIG. 2 depicts an exemplary embodiment of a system 150 for providing dynamic content compatible with multiple formats. Although various portions of the system 150 are depicted in FIG. 2, other embodiments may include other, additional, and/or fewer components than the system 150. Similarly, in other embodiments, some of the functions performed by components of the system 150 may be separated into different components, combined into fewer components, or otherwise rearranged. The activities may be performed through a variety of electronic media and platforms, for example via the Internet, through a cell network, using mobile phones, desktop computer systems, PDAs, laptop computer systems, or other electronic systems. The platforms, both devices and sites, may be compatible with different dynamic formats. For example, some may use dynamic formats such as HTML5, others may use Flash, while still others may use another dynamic format or no dynamic format. Finally, although described in the context of development of dynamic content for an ad, another type of dynamic content may be provided. The system 150 is also described in the context of the method 100. However, the system 150 may be used with other steps and/or other methods (not shown in FIG. 1).

Referring to FIGS. 1-2, the system 150 includes a provider 160, a developer's system 180, sites 190 and 190' and end users 192 and 196. For simplicity, two sites 190 and 190' and two end users 192 and 196 are shown. However, another number may be present. Similarly, one developer's system 180 is shown. However, another number may be present. The end user A 192 and end user B 196 may correspond to devices used by individuals, such as an Apple® iPad™, Apple® iPhone™, another computer system, a Blackberry®, a PDA, another cellular phone, or analogous device. Thus, although browsers 194 and 198 are shown, the browsers 194 and 198 may be other components used in accessing the dynamic content. The developer's system 180 may include a browser and/or development tools 182 used in connection with the provider 160. Also note that the developer 180, site 190, and end users 192 and 196 may be considered separate/decoupled from the provider 160.

The provider 160 includes a development system 162 resident on one or more servers or other device(s). The provider 160 may be accessed via the Internet, a local network, and/or another analogous mechanism. The development system 162 may include a content maker/editor 164 as well as content generator/translator/compiler 166 (content generator 166). The development system 162 may be considered to be software executing on one or more processors for the provider 160. Although shown as a single block, the content generator 166 may be divided into separate components, for example based upon function. Similarly, the content maker/editor 164 may be separated into multiple components. The content maker/editor 164 may be used to generate the dynamic content. For example, the content maker/editor 164 may be used in configuring the dynamic content in step 102. Thus, the developer may use browser/development tools 182 to access the provider 160, for example via the Internet. Using the browser/development tool 182, the developer may upload multimedia content, edit content and otherwise configure the dynamic content using the content maker/editor. For example, the developer may configure the dynamic content in XML only. In addition, the browser/development tools 182 may be used by the developer to make other selections, such as the modifiability of the configuration selected, the order in which dynamic representations may be provided to an end user 192 and/or 196, the dynamic representations desired to be supported and other selections. Thus, the dynamic content may be configured and/or changed through the browser/development tools 182 and the content maker/editor 164. The content generator 166 generates the dynamic representations of the dynamic content. The content generator 166 may do so in response to the developer opting to publish the dynamic content. The content generator 166 may automatically provide the dynamic representations of the dynamic content by some combination of translating and compiling the dynamic content. Further, the content generator 166 may automatically generate the dynamic representations substantially simultaneously. Thus, the translation, compilation, and/or other functions may be provided by the content generator 166 substantially simultaneously for the various dynamic representations. In addition, the content generator 166 generates logic corresponding to the dynamic representations. The logic 178 is provided to the developer and thus is shown on the developer's system 180. In some embodiments, the logic 178 is a widget, discussed above.

In the embodiment shown, representations 170, 172, 174, and 176 of the dynamic content are stored in storage 168. In some embodiments, some representations 170, 172, and 174 are dynamic representations. One or more remaining representation, such as the representation 176, may be a static representation of the dynamic content. Although three dynamic representations 170, 172, and 174 and one static representation 176 are shown, in another embodiment, a different number of dynamic representations and static representation(s) may be provided. Further, the representations 170, 172, 174, and 176 are all shown as residing on storage 168. However, in another embodiment, one or more of the dynamic representations 170, 172 and 174 may be embedded in the logic 178. Similarly, one or more static representation may be embedded in the logic 178. In some embodiments, the representations 170, 172, 174, and/or 176 may both reside on the storage 168 and be embedded in the logic 178. Thus, the steps 102, 104, and 106 may be performed using the provider 160. Further, a developer may configure the dynamic content only once despite multiple dynamic representations 170, 172, and 174 are provided.

In some embodiments, the developer provides the logic 178 to third parties for use on their sites and/or uses the logic 178 on the developer's own site. For example, if a particular automobile company is the developer of an ad for a car, the ad may be desired to be placed on the automobile company's own site, on automobile publications' sites, on sports or other television channel's sites, and/or elsewhere. In such a case, the automobile company/developer may use the logic 178 corresponding to the ad/dynamic content on their own site and may provide the logic 178 to third parties. Thus, logic 178' and 178" are shown on sites 190 and 190', respectively. The developer may own one or both of site 1 190 and site 2 190'. Alternatively, the developer may own neither site 1 190 nor site 2 190'. In some embodiments, the developer may allow the owners of the sites 190 and/or 190' to modify the selections made when configuring the logic 178. Thus, the logic 178' and/or 178" may differ from the logic 178. For example, the site 190 may support only Flash playback, while the site 190' may support HTML5 and Flash. The logic 1 178' may thus be configured to access only the dynamic representation (e.g. representation 170) that corresponds to a Flash format. In contrast, the logic 178" may access the dynamic representation (e.g. representations 170) that corresponds to the Flash format and the dynamic representation (e.g. representations 172) that corresponds to the HTML5 format.

The end users 192 and 196 wish to view the content on the sites 190 and 192, respectively. Thus, the end user A 192 may use browser 194 or other analogous component to access the site 190. Similarly, the end user B 196 may use browser 198 or other analogous component to access the site 190'. These accesses may be via the Internet, a cellular phone network, or other analogous mechanism. For example, an end user, such as the end user A 192, may access the site 190. If available, the logic 178' provides an appropriate dynamic representation 170, 172, and/or 174 to the end user 192. If the appropriate dynamic representation 170, 172, and/or 174 is not available, then the static representation 176 may be provided to the end user A 192. The logic 178' may perform these functions in response to the end user A performing various activities. For example, the activities could include one or more of logging onto the site 190, clicking on a button on the site 190, and providing another input to the site 1 190. The logic 178' may interrogate the end user A computing device 192 to determine the appropriate dynamic representation 170, 172, or 174. Depending upon the selections made by the developer and/or the owner of the site 190, dynamic representations 170, 172, and/or 174 may be attempted to be provided to the end user A 192 in a particular order; the static representation 176 may be provided, or other tasks performed. In some embodiments, one or more of the representations 170, 172, 174, and 176 may be fetched from the storage 168. In other embodiments, one or more of the representations 170, 172, 174, and 176 may be embedded in the logic 1 178'. In either case, the appropriate dynamic representation 170, 172, or 176, if available, may be provided to the end user A 192.

Using the system 150, the appropriate dynamic representation of dynamic content may be provided to an end user. This may be accomplished without requiring separate development of the dynamic content for each dynamic format desired to be supported. As a result, a developer may simply and easily provide dynamic content, such as an ad, for multiple sites and/or platforms. For example, the developer may configure the dynamic content once using XML. The dynamic representations in Flash, HTML5 and/or other dynamic formats may be providing without requiring significant additional effort on the part of the developer of the dynamic content. In addition, the developer or other party may elect how the dynamic representation(s) and/or static representation(s) are provided to the end user. Thus, the flexibility of the development process and presentation of content to the end user may also be improved.

Figure 3:
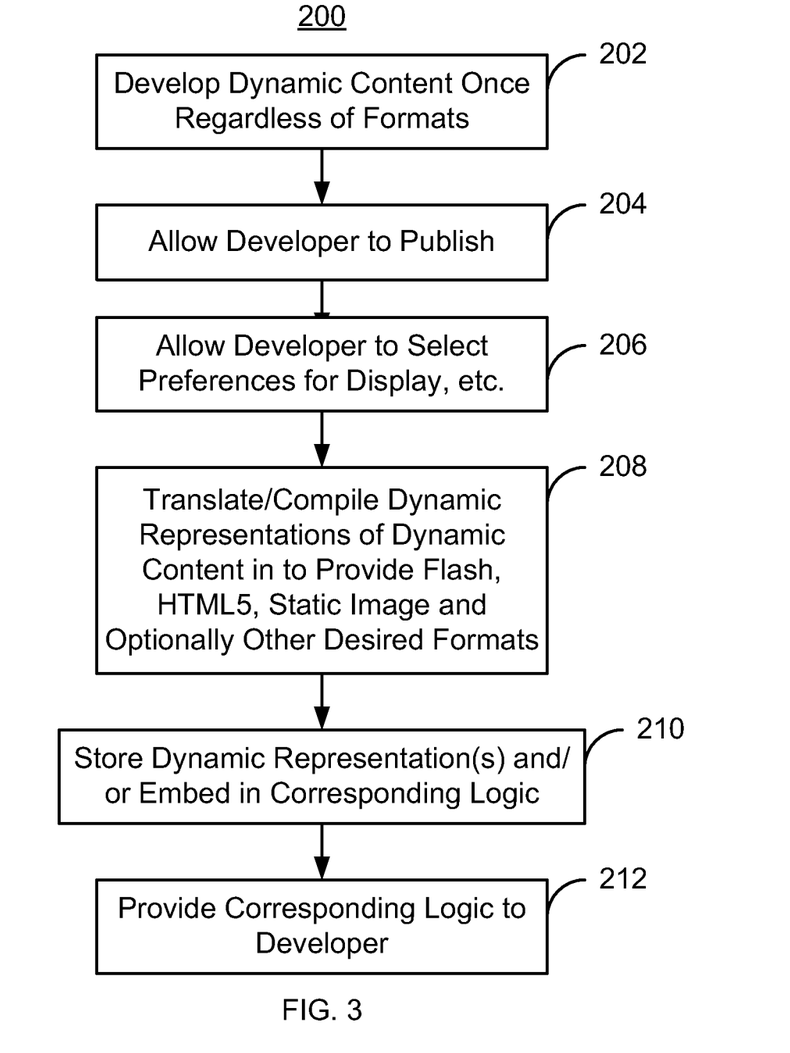
FIG. 3 depicts another exemplary embodiment of a method for providing dynamic content compatible with multiple dynamic formats.

FIG. 3 depicts another exemplary embodiment of a method 200 for providing dynamic content compatible with multiple formats. Although the method 200 is described as including particular steps, the method 200 may include other steps not inconsistent with the method and system. Further, certain steps of the method 200 might be combined or split into multiple substeps. Although the method 200 is described in a particular sequence, in some embodiments certain steps may be performed in another order and at least partially in parallel. The method 200 may be used in the case where at least Flash/SWF and HTML5 formats are desired to be supported.

Figure 4:
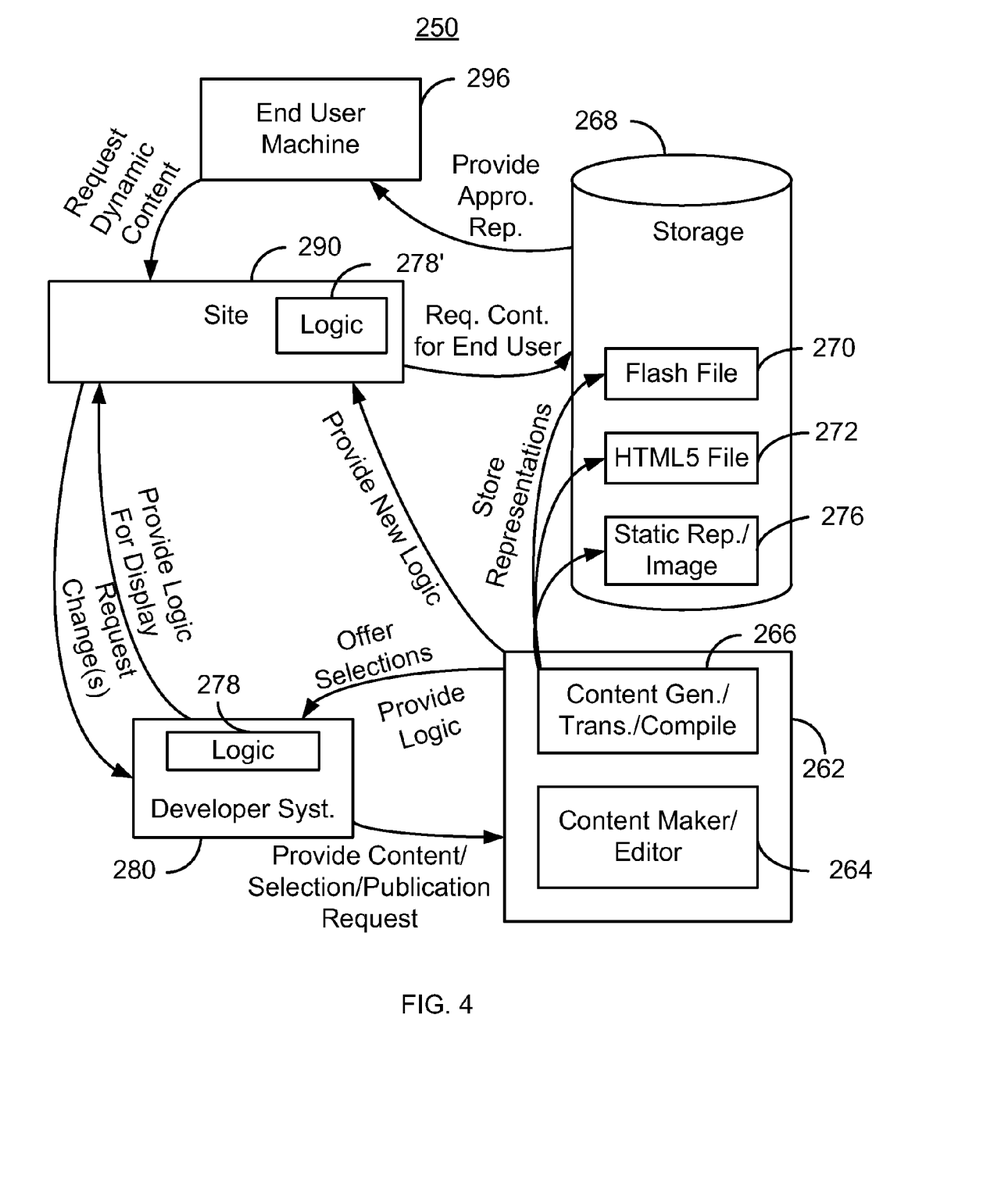
FIG. 4 depicts another exemplary embodiment of a system for providing dynamic content compatible with multiple dynamic formats.

FIG. 4 depicts another exemplary embodiment of a system 250 for providing dynamic content compatible with multiple formats. The system 250 is described in connection with the method 200. However, the method 200 and system 250 may be used independently. Although various portions of the system 250 are depicted in FIG. 4, other embodiments may include other, additional, and/or fewer components than the system 250. Similarly, in other embodiments, some of the functions performed by components of the system 250 may be separated into different components, combined into fewer components, or otherwise rearranged. The activities may be performed through a variety of electronic media and platforms, for example via the Internet, through a cell network, using mobile phones, desktop computer systems, PDAs, laptop computer systems, or other electronic systems. The platforms, both devices and sites, may be compatible with different dynamic formats. For example, some may use dynamic formats such as HTML5, others may use Flash, while still others may use another dynamic format or no dynamic format. Although described in the context of development of dynamic content for an ad, another type of dynamic content may be provided. The system 250 is analogous to the system 150. Consequently, the system 250 includes developer's system 262 including a content maker/editor 264 and content generator 266, storage 268, developer computer system 280, site 290, and end user 296 corresponding to developer's system 162 including a content maker/editor 164 and content generator 166, storage 168, developer's computer system 180, site 190, and end user 196, respectively. For clarity, a portion of the system 250 may be omitted. Also note that the developer 280, site 290, and end user 296 may be considered separate/decoupled from the development system 262 and storage 268.

Referring to FIGS. 3-4, a developer using the developer's computer system 280 is allowed to provide dynamic content once regardless of the number of dynamic formats to be supported, via step 202. Step 202 may include configuring the dynamic content in XML. Step 202 is thus analogous to step 102 of the method 100. Step 202 may include using the content generator 266 to offer the developer 280 selections, for example through a menu or wizard and/or allowing the developer to more freely determine the configuration of the dynamic content. Thus, as in FIG. 4, the developer may provide content and/or make selections of the development system 260. More specifically, the content may be provided using the content maker/editor 264.

The developer is allowed to publish the dynamic content, via step 204. Step 204 may include allowing the developer to select a "publish" function, for example via a drop down menu or clicking on a button. The developer may then be allowed to determine the display and other preferences, via step 206. For example, the developer may be allowed to select the desired dynamic representations (Flash and HTML5 in the embodiment shown), the order in which different dynamic representations are attempted to be displayed, whether and how a third party is allowed to alter the developer's selections, and/or other features related to the dynamic content. Step 206 may include offering the developer a set of selections, providing a wizard that leads the developer through the process, and/or performing other functions.

The dynamic content is automatically then translated and/or compiled into dynamic representations, via step 208. Step 208 may be completed using the content generator 266. Step 208 may also include generating a static representation, such as an image. The image may be generic or may be a customized image, such as one provided by the developer or selected from a portion of the dynamic content. Step 208 is analogous to step 104, described above. Thus, the desired dynamic formats, including hardware and software environments, are taken into account in the translation. In addition to providing the Flash, HTML5 and static representations of images, additional logic may be provided to ensure the desired user interactivity. Further, code may also be pruned in order to optimize the output provided to the developer.

The Flash and HTML dynamic representations are then stored and/or embedded in logic, via step 210. These dynamic representations may include logic corresponding to different devices that support Flash, HTML or other desired dynamic formats. In the embodiment shown, the content generator 266 stores the dynamic representations 270 and 272 as well as the static representation/image 276 in the storage 268. However, in other embodiments, some or all of the dynamic representations 270 and 272 and/or the static representation 276 may be embedded. If not completely embedded in the logic 278, then the locations or other information used to access the representations 270, 272, and 276 may be embedded in the logic 278. The logic 278 corresponding to the representations 270, 272, and 276/dynamic content may then be provided to the developer system 280. As shown in FIG. 4, the developer may provide the logic 278 as is to the site 290. Alternatively, the owners or administrators of the site 290 may request changes to the dynamic content. These changes may be based upon the particular dynamic formats supported or based on the multimedia content itself. The developer may accept the changes, refuse the changes, or come up with some other alternative. Thus, the logic 278' residing on the site 290 may or may not be identical to the logic 278 provided to the developer system 280. Further, in some embodiments, the changes to the logic 278 and/or dynamic content may be made directly by the owners or operators of the site 290 using the system 262.

Using the method 200, dynamic representations 270 and 272 of dynamic content may be provided. This may be accomplished without requiring separate development the dynamic content for each dynamic format desired to be supported. As a result, a developer may simply and easily provide dynamic content, such as an ad, for multiple sites and/or platforms. For example, Flash, HTML5 and/or other dynamic formats may be supported without requiring significant additional effort on the part of the developer of the dynamic content. In addition, the developer or other party may elect how the dynamic representation(s) and/or static representation(s) are provided to the end user. Thus, the flexibility of the development process and presentation of content to the end user may also be improved.

Figure 5:
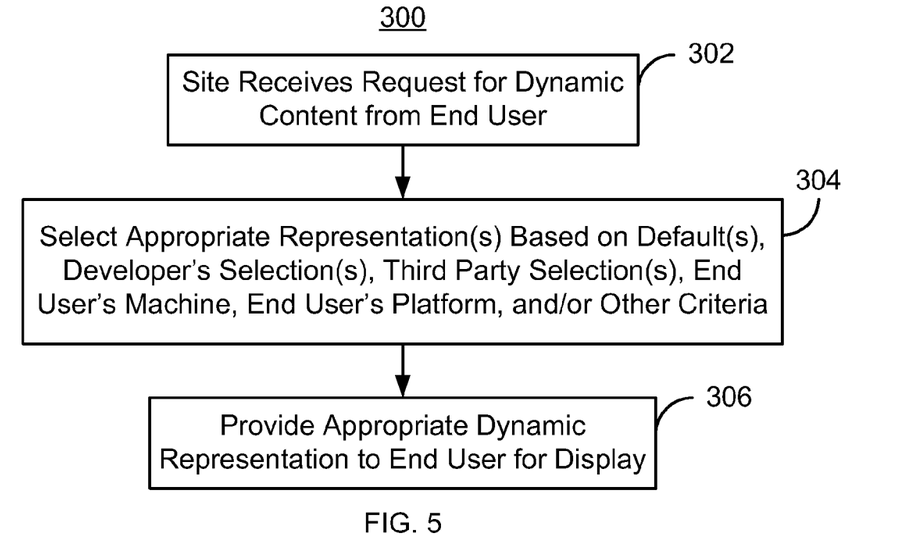
FIG. 5 depicts another exemplary embodiment of a method for providing dynamic content compatible with multiple dynamic formats.

FIG. 5 depicts another exemplary embodiment of a method 300 for providing dynamic content compatible with multiple formats to a site. Although the method 300 is described as including particular steps, the method 300 may include other steps not inconsistent with the method and system. Further, certain steps of the method 300 might be combined or split into multiple substeps. Although the method 300 is described in a particular sequence, in some embodiments certain steps may be performed in another order and at least partially in parallel. The method 300 may be used in the case where at least Flash/SWF and HTML5 formats are desired to be supported. The method 300 is described in the context of the system 250 depicted in FIG. 4. However, in some embodiments, the method 300 and system 250 may be decoupled.

Referring to FIGS. 4-5, the site 290 receives a request for the dynamic content from the end user, via step 302. Step 302 may include the site 290 being accessed, particular buttons being selected, or another analogous action being taken.

In response, the logic 278' may determine the appropriate dynamic representation(s) of the dynamic content, via step 304. The appropriate dynamic representation(s) are selected based on criteria such as any default(s) of the system 262/264, the developer's selection(s), selection(s) of the third party owning the site 290, the end user's machine 296, the platform of the end user's machine 296 or site 290, and/or other criteria.

The appropriate dynamic content is then provided to the end user, via step 306. Step 306 may include accessing one or more of the dynamic representations 270 and 272 and/or the static representation 276. The end user's machine 296 may receive the representation(s) 270, 272, and/or 276 from the storage 268. For example, if the end user's machine 296 is compatible only with Flash, then the dynamic representation 270 may be requested, for example by the site 290 (or by the end user's machine 296) and provided to the end user's machine 296. If the end user's machine 296 is compatible only with HTML5, then the dynamic representation 272 may be requested, for example by the site 290/user's machine 296 and provided to the end user's machine 296. If the end user's machine 296 is not compatible with HTML5 or Flash, then the static representation 276 may be requested by the site 290/user's machine 296 and provided to the end user's machine 296. Thus, the desired content is served to the end user. The end user's machine 296 may then play the dynamic representation 270 or 272 or the static representation 276 in a conventional manner.

Figure 6:
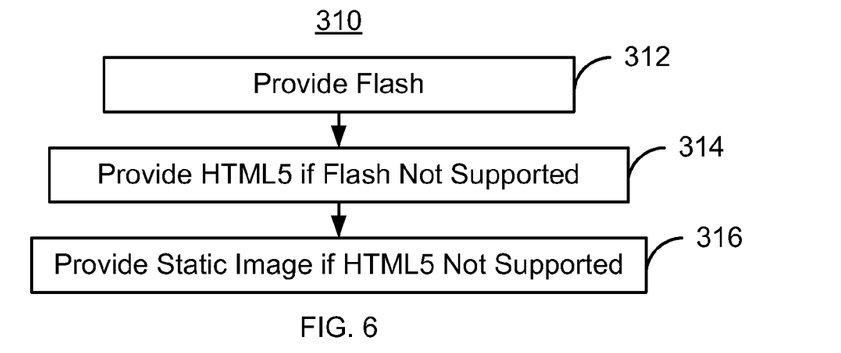
FIG. 6 depicts another exemplary embodiment of a method for receiving dynamic content compatible with multiple dynamic formats.

FIG. 6 depicts another exemplary embodiment of a method 310 for receiving dynamic content compatible with multiple formats. Although the method 310 is described as including particular steps, the method 310 may include other steps not inconsistent with the method and system. Further, certain steps of the method 310 might be combined or split into multiple substeps. Although the method 310 is described in a particular sequence, in some embodiments certain steps may be performed in another order and at least partially in parallel. The method 310 may be used in the case where at least Flash/SWF and HTML5 formats are desired to be supported. The method 310 is described in the context of the system 250 depicted in FIG. 4. However, in some embodiments, the method 310 and system 250 may be decoupled. The method 310 may be performed when the sequence in which the representations 272, 272, and 276 to be provided to an end user is selected by the developer and/or third party owner of the site 290.

Referring to FIGS. 4 and 6, the Flash representation 270 of the dynamic content is provided to the end user's machine 296, via step 312. Step 312 may be performed by the Flash representation 270 being pulled by or pushed to the user's machine 296. Thus, the user's machine 296 may attempt to play the Flash representation 270. If the end user's machine 296 is not compatible with the Flash representation 270, then the user's machine 296 may provide an indication of this to the site 290 and/or the provider of the storage 268. If the end user's machine 296 is compatible with Flash, then a different indication may be provided. For example, request for additional Flash data or other indication may be sent by the end user's machine 296.

If the end user's machine 296 is not compatible with the Flash, then the HTML5 representation 272 is provided to the end user's machine 296, via step 314. Step 314 may be performed by the HTML5 representation 272 being pulled by or pushed to the user's machine 296. Thus, the user's machine 296 may attempt to play the HTML5 representation 272. If the end user's machine 296 is not compatible with the HTML5, then the end user's machine 296 may provide an indication of this to the site 290 and/or the provider of the storage 268. If the end user's machine 296 is compatible with the HTML5, then a different indication may be provided. For example, request for additional HTML5 data or other indication may be sent by the end user's machine 296. If the end user's machine 296 is not compatible with the HTML5, then the static representation 276 is provided to the end user's machine 296, via step 316. Once the appropriate representation is provided to the end user's machine, the appropriate representation 270, 272, or 276 might be played in a conventional manner.

Thus, through the method 310, the appropriate representation 270, 272, and/or 276 may be provided to the end user's machine 296. Thus, the desired dynamic content, such as an ad, may be provided to the end user in a desired format. This may be achieved without requiring multiple development cycles for different dynamic formats. Thus, flexibility may be improved without unduly complicating the development process.

Figure 7:
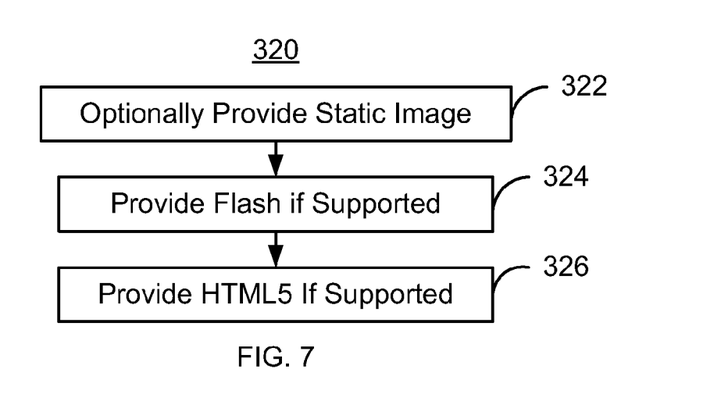
FIG. 7 depicts another exemplary embodiment of a method for receiving dynamic content compatible with multiple dynamic formats.

FIG. 7 depicts another exemplary embodiment of a method 320 for receiving dynamic content compatible with multiple formats. Although the method 320 is described as including particular steps, the method 320 may include other steps not inconsistent with the method and system. Further, certain steps of the method 320 might be combined or split into multiple substeps. Although the method 320 is described in a particular sequence, in some embodiments certain steps may be performed in another order and at least partially in parallel. The method 320 may be used in the case where at least Flash/SWF and HTML5 formats are desired to be supported. The method 320 is described in the context of the system 250 depicted in FIG. 4. However, in some embodiments, the method 320 and system 250 may be decoupled.

Referring to FIGS. 4 and 7, the static representation 276 is provided to the end user's machine 296, via step 322. Flash representation 270 of the dynamic content is provided to the end user's machine 296 if Flash is supported, via step 324. Step 324 may be performed by the Flash representation 270 being pulled by or pushed to the user's machine 296. Once received, the user's machine 296 may attempt to play the Flash representation 270. The static image from the static representation 276 may thus be updated with dynamic content. In some embodiments, the Flash representation 270 is provided without determining whether the end user's machine 296 is compatible with Flash. In such cases, an indication of compatibility/incompatibility may be provided by the end user's machine 296.

The HTML5 representation 272 is provided to the end user's machine if HTML5 is supported, via step 326. Step 326 may be performed by the HTML5 representation 272 being pulled by or pushed to the user's machine 296. Once received, the user's machine 296 may attempt to play the HTML5 representation 272. The static image from the static representation 276 may thus be updated with dynamic content. In some embodiments, the HTML5 representation 272 is provided without determining whether the end user's machine 296 is compatible with Flash. In such cases, an indication of compatibility/incompatibility may be provided by the end user's machine 296.

Thus, through the method 320, the appropriate representation 270, 272, and/or 276 may be provided to the end user's machine 296. Thus, the desired dynamic content, such as an ad, may be provided to the end user in a desired format. This may be achieved without requiring multiple development cycles for different dynamic formats. Thus, flexibility may be improved without unduly complicating the development process.

Figure 8:
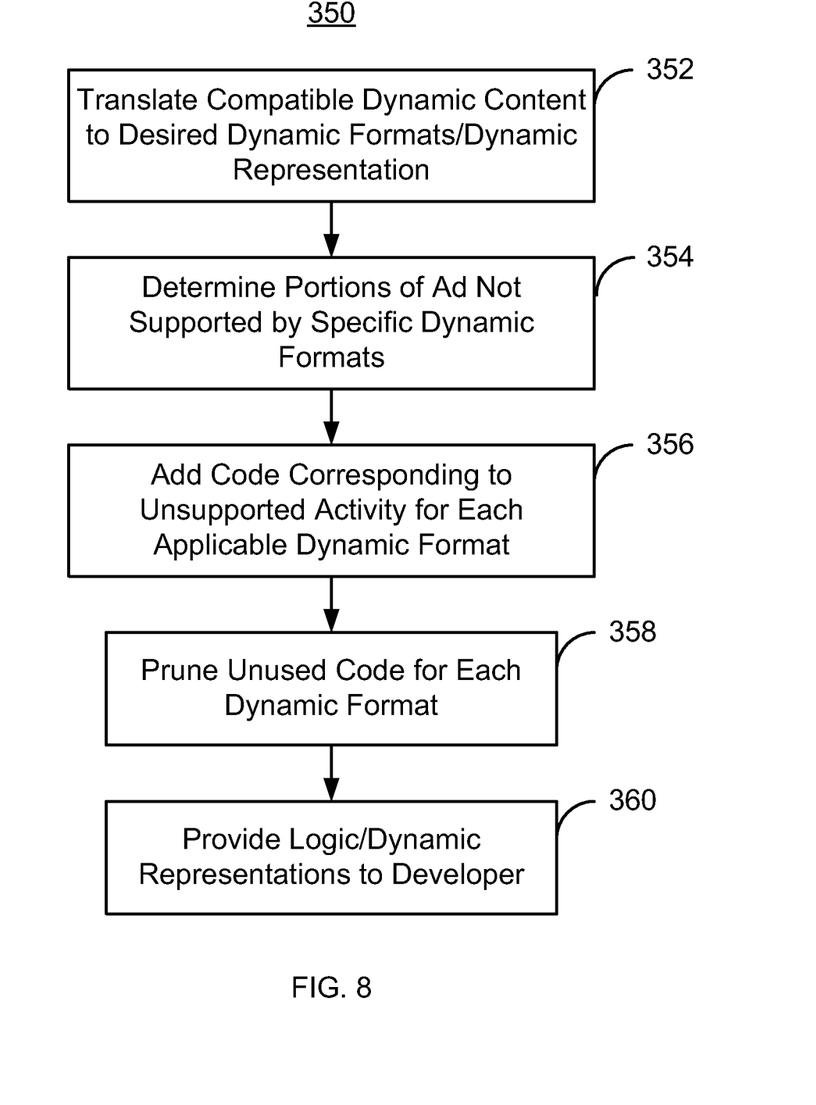
FIG. 8 depicts an exemplary embodiment of a method for translating an ad into the desired dynamic formats.

FIG. 8 depicts an exemplary embodiment of a method 350 for receiving dynamic content compatible with multiple formats. Although the method 350 is described as including particular steps, the method 350 may include other steps not inconsistent with the method and system. Further, certain steps of the method 350 might be combined or split into multiple substeps. Although the method 350 is described in a particular sequence, in some embodiments certain steps may be performed in another order and at least partially in parallel. The method 350 is described in the context of at least Flash/SWF and HTML5 formats. The method 350 is performed by the content generator/translator/compiler 266 of the system 250 depicted in FIG. 4. However, in some embodiments, the method 350 and system 250 may be decoupled. The method 350 may be seen as corresponding to portions of step 104 or 208, described above.

To the extent possible, the portion of the dynamic contents specified by the developer is translated to the desired dynamic formats, via step 352. Thus, video, corresponding static images, user input methods, input hardware, and other aspects of the dynamic content desired to be provided via Flash and HTML5 are translated to these formats. Code corresponding to the desired devices to be supported is also provided to the extent possible in step 352. If the developer's ad is completely compatible with Flash and HTML5, then the dynamic representation of the ad may be completely translated and compiled in step 352.

It is determined whether there are aspects of the ad not supported by one or more of the dynamic formats, via step 354. For example, it may be determined whether the level and type of interactivity are supported by all dynamic formats. This may include determining whether specified devices support a particular type of user interaction (such as dragging an image or swiping). Thus, step 354 may be used in extending the ad to additional devices of interest.

Code for to the unsupported aspects of the ad is added to the corresponding dynamic representation, via step 356. For example, if a particular mechanism for user interaction (such as a swipe) is not supported by a device, then logic for a corresponding interaction (such as shaking a device or selection of a button) may be added. Step 356 may include temporarily suppressing or disabling capabilities for the device that are inconsistent with the desired interaction. In some embodiments, step 356 is only performed for those dynamic formats or devices for which some portion of the ad is not compatible.

The code for the dynamic formats may then be optionally pruned, via step 358. Step 358 includes determining which portions of the code generated in steps 352-356, if any, are not used by the dynamic format. These sections are then removed. As a result, the size of the logic provided may be reduced. The logic corresponding to the dynamic representations formulated in steps 352-358 is provided to the developer, via step 360. Thus, a developer may be provided with multiple representations of an ad developed in a single process.

A method and system for more easily and rapidly generating dynamic content that is compatible with multiple dynamic formats are described. The method and system has been described in accordance with the embodiments shown, there could be variations to the embodiments, and any variations would be within the spirit and scope of the present invention. Accordingly, many modifications may be made by one of ordinary skill in the art without departing from the spirit and scope of the appended claims.

What is claimed is:

1. A computer-implemented method for providing dynamic content to end users, the method comprising:
  receiving the dynamic content from a developer;
  providing a plurality of dynamic representations of the dynamic content, the plurality of dynamic representations corresponding to a plurality of dynamic formats, wherein the step of providing the plurality of dynamic representations further includes translating the dynamic content into the plurality of dynamic formats; and
  providing to the developer logic corresponding to the plurality of dynamic representations, wherein the dynamic content includes at least one user interaction and wherein the step of translating the dynamic content further includes
    determining whether the at least one user interaction is supported by each of the plurality of dynamic formats; and
    adding code corresponding to the at least one user interaction for at least one of the plurality of dynamic formats not supporting the at least one user interaction.

2. The computer-implemented method of claim 1 wherein an end user employs a device corresponding to a particular dynamic format of the plurality of dynamic formats, the method further comprising:
  providing to the end user a dynamic representation corresponding to the particular dynamic format.

3. The computer-implemented method of claim 1 wherein the step of adding code further includes:
  disabling a portion of the at least one dynamic format incompatible with the corresponding dynamic representation.

4. The computer-implemented method of claim 1 wherein the plurality of dynamic formats include Flash and HTML5.

5. The computer-implemented method of claim 1 wherein the dynamic content includes an ad.

6. A computer-implemented method for providing dynamic content to end users, the method comprising:
receiving the dynamic content from a developer;
providing a plurality of dynamic representations of the dynamic content, the plurality of dynamic representations corresponding to a plurality of dynamic formats, wherein the step of providing the plurality of dynamic representations further includes
translating the dynamic content into the plurality of dynamic formats; and
pruning unused code from the logic corresponding to at least one of the plurality of dynamic representations; and
providing to the developer logic corresponding to the plurality of dynamic representations.

7. The computer-implemented method of claim 6 wherein the step of pruning the unused code further includes:
determining whether the logic corresponding each of the plurality of dynamic representations includes the unused code; and
removing the unused code from the at least one of the plurality of dynamic representations.

8. The computer-implemented method of claim 7 wherein the plurality of dynamic formats correspond to a plurality of devices.

9. The computer-implemented method of claim 8 wherein the plurality of devices include at least one cellular phone, at least one laptop, and at least one tablet.

10. The computer-implemented method of claim 9 wherein the plurality of devices further include at least one gaming system.

11. A computer-implemented method for providing dynamic content to end users, the method comprising:
receiving the dynamic content from a developer;
providing a plurality of dynamic representations of the dynamic content, the plurality of dynamic representations corresponding to a plurality of dynamic formats, the step of providing the plurality of dynamic representations further including
determining whether at least one user interaction is supported by each of the plurality of dynamic formats;
adding code corresponding to the at least one user interaction for at least one of the plurality of dynamic formats not supporting the at least one user interaction;
determining whether logic corresponding each of the plurality of dynamic representations includes unused code; and
removing the unused code from the at least one of the plurality of dynamic representations; and
providing to the developer the logic corresponding to the plurality of dynamic representations.

12. A system for providing dynamic content to end users comprising;
a storage;
at least one processor coupled to the storage;
a content maker executed by the at least one processor and for receiving the dynamic content from the developer;
a content generator/translator/compiler executed by the at least one processor, the content generator/translator/compiler for providing a plurality of dynamic representations of the dynamic content, the plurality of dynamic representations corresponding to a plurality of dynamic formats, the content generator/translator/compiler further for providing to the developer logic corresponding to the plurality of dynamic representations;
wherein the dynamic content includes at least one user interaction and wherein the content generator/translator/compiler further determines whether the at least one user interaction is supported by each of the plurality of dynamic formats and adds code corresponding to the at least one user interaction for at least one of the plurality of dynamic formats not supporting the at least one user interaction.

13. The system of claim 12 wherein the content generator/translator/compiler further disables a portion of the at least one dynamic format incompatible with the corresponding dynamic representation.

14. The system of claim 12 wherein the plurality of dynamic formats include Flash and HTML5.

15. The system of claim 14 wherein the plurality of dynamic formats correspond to a plurality of devices.

16. A system for providing dynamic content to end users comprising;
a storage;
at least one processor coupled to the storage;
a content maker executed by the at least one processor and for receiving the dynamic content from the developer;
a content generator/translator/compiler executed by the at least one processor, the content generator/translator/compiler for providing a plurality of dynamic representations of the dynamic content, the plurality of dynamic representations corresponding to a plurality of dynamic formats, the content generator/translator/compiler further for providing to the developer logic corresponding to the plurality of dynamic representations;
wherein the content generator/translator/compiler further determines whether the logic corresponding each of the plurality of dynamic representations includes the unused code and removes the unused code from the at least one of the plurality of dynamic representations.

* * * * *